United States Patent [19]

Stark

[11] 4,262,718
[45] Apr. 21, 1981

[54] LUGGAGE CLOSURE

[75] Inventor: Theodore S. Stark, Montclair, N.J.

[73] Assignee: M & M Luggage Co., Inc., Jersey City, N.J.

[21] Appl. No.: 21,501

[22] Filed: Mar. 19, 1979

[51] Int. Cl.³ .................... A45C 13/10; A44B 11/00
[52] U.S. Cl. .................................. 150/42; 24/197; 24/201 HE; 24/201 TR; 24/225; 24/230 R; 24/230.5 R; 190/41 R
[58] Field of Search ............... 150/42, 46; 190/48, 190/59, 41 R; 24/16 PB, 17 AP, 182, 197, 230 R, 30.5 R, 73 R, 73 CC, 79, 201 R, 203 R, 265 R, 265 A, 265 BC, 266, 201 HE, 225, 230.5 R, 201 TR

[56] References Cited

U.S. PATENT DOCUMENTS

| 429,179 | 6/1890 | Shipman | 24/266 |
|---|---|---|---|
| 903,808 | 11/1908 | Bienenstock | 190/48 |
| 1,348,703 | 8/1920 | Ferris | 24/266 |
| 2,343,708 | 3/1944 | Roseman | 24/266 |
| 3,205,544 | 9/1965 | Streule et al. | 24/73 |

FOREIGN PATENT DOCUMENTS 941213 11/1963 United Kingdom ............... 190/48

Primary Examiner—Roy D. Frazier
Assistant Examiner—Alexander Grosz
Attorney, Agent, or Firm—Hubbell, Cohen, Stiefel & Gross

[57] ABSTRACT

A closure for securing the flap of a bag to the front wall thereof comprises a link having a thru-opening, means for hingeably securing the link to the flap, a strap dimensioned to pass through the opening, and means for securing one end of the strap to the front wall of the bag, the strap being comprised of an elastic, semi-rigid material biased to a folded position. In the closed position, the strap is in the folded position, the portion of the strap between its free end and the bight of the fold extends through the opening and the portion of the strap between the bight of the fold and the secured end overlies the edge portion of the flap.

5 Claims, 4 Drawing Figures

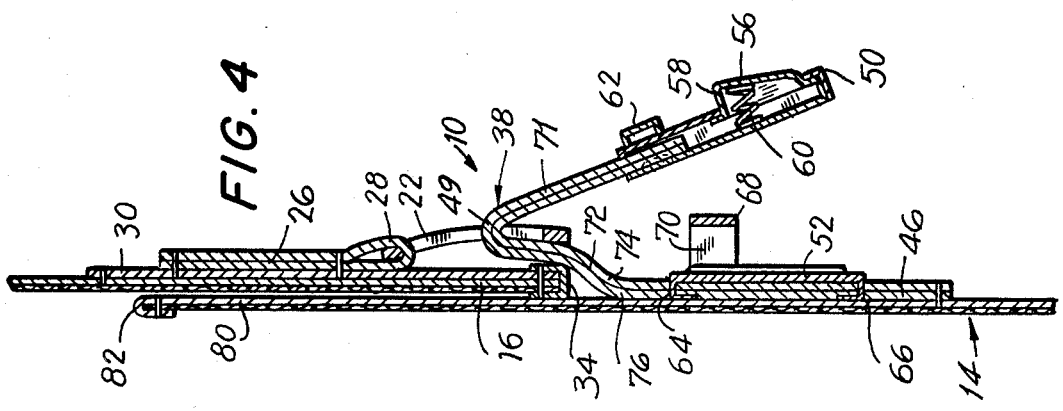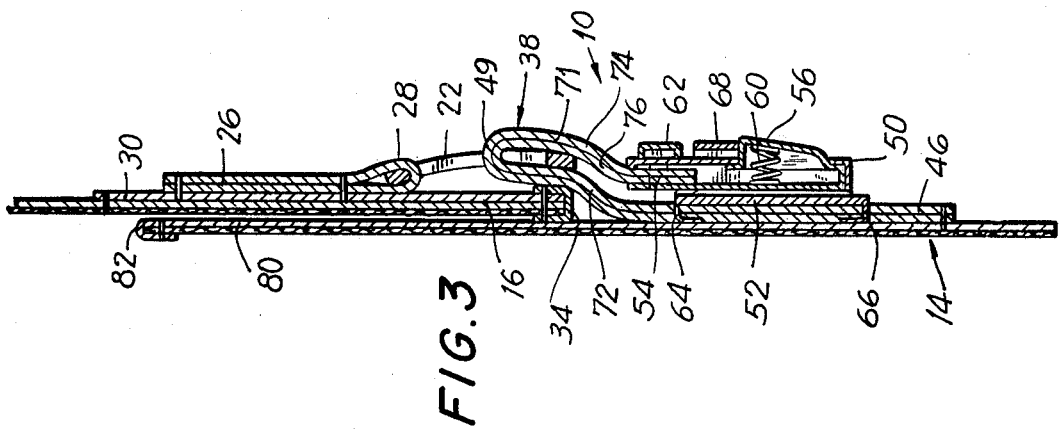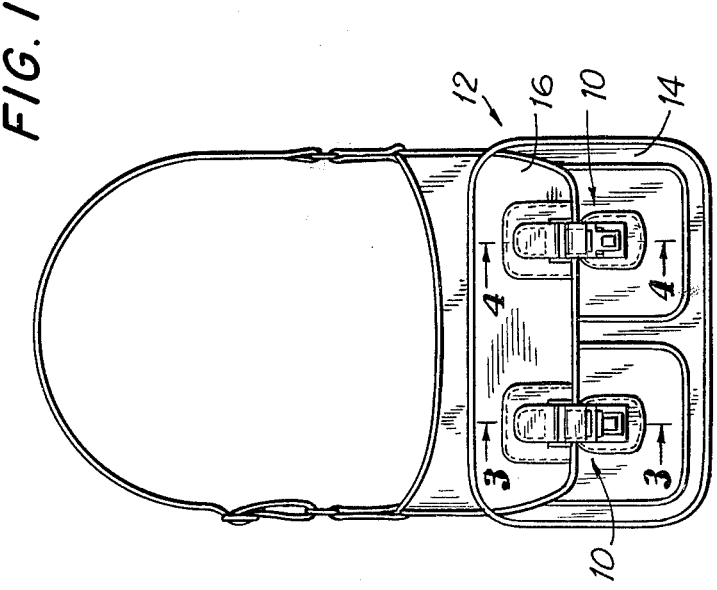

LUGGAGE CLOSURE

BACKGROUND OF THE INVENTION

1. Field of the Invention

This invention relates to closures and more particularly to non-locking closures for hand luggage, handbags and the like. Most particularly, this invention pertains to closures of the type wherein a strap attached to the front of the bag is passed through a link on the flap, folded back on itself, and detachably fastened to the front of the bag.

2. Description of the Prior Art

Prior art non-locking luggage closures of the type wherein a strap attached to the front of the bag is passed through a link on the flap, doubled over onto itself, and then detachably fastened to the front of the bag are well known. See also U.S. Pat. Nos. 429,179, 1,348,703, 3,205,544, and 2,343,708 wherein such closures are applied to articles other than luggage. While such devices provide a positive and reliable closure when the free end of the strap is detachably fastened to the front of the bag, they have little or no effect when the free end of the strap is not so fastened. This is primarily due to the fact that the straps used in such prior art devices are easily returned to a flat position thus facilitating removal of the strap through the link. This situation is worsened where the link hangs beyond the edge of the flap, when the strap is biased to its original flat form, or when bags relying on such devices are full, in which case the forces applied to the internal walls of the bag may be sufficient to force the strap back through the link. Thus, whenever the strap is not fastened to the front of the bag, bags relying on such devices are prone to accidental opening. Even when the strap is detachably fastened to the front of the bag, such closures are easily opened by unauthorized persons.

SUMMARY OF THE INVENTION

According to the present invention, I have developed a non-locking closure for luggage, handbags and similar articles of the type wherein a strap secured at one end to the front wall of the article is passed through a link hingeably secured to the flap of the article. The principal advantage of the closure according to the present invention as compared with prior art closures is that it provides a positive and reliable closure even when the free end of the strap is not secured to the wall of the article.

According to invention, this is accomplished by utilizing a strap comprised of an elastic, semi-rigid material formed with a bias to a folded position wherein a portion of the strap on one side of the bight of the fold overlies a portion of the strap on the other side of the bight. Also, the link is secured to the flap of the article such that when the link is substantially coplanar with the flap, substantially the entire opening overlies the flap. Thus, when the strap is passed through the link and then released, the bias returns the strap to its folded position wherein the portion of the strap between its secured end and the bight overlies the leading edge of the flap. In this position, the bias prevents the free end of the strap from slipping back through the link and thus prevents disengagement of the cover from the front wall of the article. In the event a positive disengaging force is applied to the cover of the article, the portion of the strap overlying the leading edge of the flap is pinched between the flap and the link. This, coupled with the semi-rigid nature of the strap and the bias built into the strap, collectively serve to retain the strap in the folded position and thus prevent the strap from slipping back through the link.

To disengage the strap from the link, the strap must be forcibly moved against its bias to a flat position whereupon the link may be moved over the free end of the strap. Since this requires more than one motion and more force than is likely to occur in most accidental contacts, it will be apparent that the closure according to the present invention is quite reliable and effective. Moreover, it is simpler than many prior art closures.

In a preferred embodiment of the present invention, means, such as a latch and keeper, are provided for securing the free end of the strap to the front wall of the article. The result is a still more effective closure than the basic embodiment described above.

Further features and advantages of the closure according to the present invention will become apparent from the following detailed decription and annexed drawings of a preferred embodiment thereof.

BRIEF DESCRIPTION OF THE DRAWINGS

In the drawings:

FIG. 1 is a front elevational view of a luggage bag incorporating two preferred closures according to the present invention, one fully secured and the other partially secured;

FIG. 3 is a sectional view taken substantially along the lines 3—3 in FIG. 1; and FIG. 4 is a sectional view taken substantially along the lines 4—4 in FIG. 1.

DETAILED DESCRIPTION OF THE PREFERRED EMBODIMENTS

Figure 2:
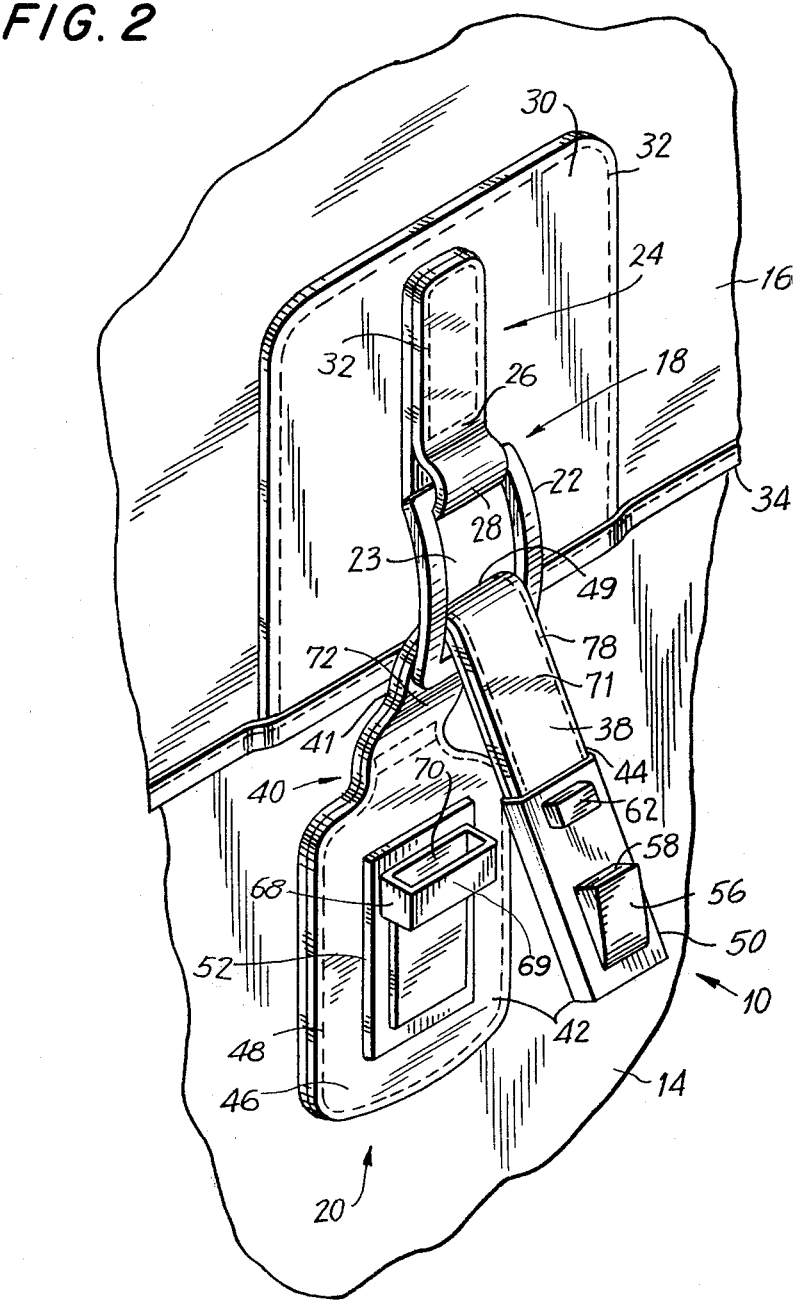
FIG. 2 is a fragmentary perspective view of the bag of FIG. 1 showing the partially secured closure.

Referring now to the drawings and initially to FIGS. 1 and 2 thereof, the preferred closure 10 according to the present invention is shown in use on a bag 12. As shown, the bag 12 has a front wall 14 and a flap 16, the flap being movable into a closed position wherein the flap overlies the upper portion of the front wall 14 and covers an opening (not shown) in the bag. While the closure 10 is shown in conjunction with a bag 12, it should be understood that the closure 10 may be used in conjunction with other articles of manufacture having equivalents of the wall 14 and flap 16.

As best shown in FIG. 2, the closure 10 comprises a first portion 18 secured to the flap 16 and a second portion 20 secured to the front wall 14. The portion 18 includes a link 22 having a thru-opening 23 and means 24 for hingeably securing the link 22 to the flap 16. While the link 22 may assume a variety of different shapes and sizes, the link 22 and the opening 23 defined thereby are preferably substantially rectangular. Likewise, while the means 24 for hingeably securing the link 22 to the flap 16 may assume a variety of different forms, it preferably comprises a folded coriaceous strip 26, the bight 28 of the fold loosely encircling one side of the link 22. Although the strip 26 may be secured directly to flap 16, it is preferably secured to a patch 30 of coriaceous material which is itself secured to the flap 16, the patch 30 serving to stiffen the flap in the vicinity of the closure portion 18. Preferably, stitching 32 is used to secure the strip 26 to patch 30 and to secure the patch 30 to the flap 16. As shown, the strip 26 is preferably secured to the flap 16 such that the entire opening 23 in the link 22 overlises the flap 16. However, this is not absolutely necessary provided substantially the entire opening 23 overlies the flap 16. The reason for this will be more fully understood hereinafter.

The portion 20 of the closure 10 comprises a strap 38 dimensioned to fit through the opening 23, means 40 for securing one end 41 of the strap 38 to the front 14 of the bag 12, and means 42 for securing the free end 44 of the strap 38 to the front wall 14. While the means 40 for securing the end 41 of the strap 38 to the front 14 of the bag 12 may vary, as presently preferred and shown, the end 41 of the strap 38 is formed integrally with an additional patch 46 of coriaceous material, the patch 46 being secured as by stitching 48 to the front 14 of the bag 12. The means 42 for securing the free end 44 of the strap 38 to the wall 14 may also vary. However, the embodiment best illustrated in FIG. 2 comprising a latch assembly 50 secured to the free end 44 of the strap 38 and a keeper 52 secured to the patch 46 is preferred. Referring now to FIGS. 2, 3 and 4, latch assembly 50 is preferably secured to the free end 44 of the strap 38 by a rivet 54. The latch assembly 50 includes a conventional tapered depress latch 56 which defines a shoulder 58 at its thickened end, the latch 56 being biased into a raised position by a coil spring 60 or the like. Latch assembly 50 also includes a stop bar 62 disposed behind the latch 56. As shown, the keeper 52 is mounted on the patch 46. As best shown in FIGS. 3 and 4, this is preferably accomplished by a pair of integral fold-down L-shaped tabs 64 and 66 at opposite ends of the keeper 52, the L-shaped tabs 64 and 66 each having one leg extending through the patch 46 and the other leg extending between the patch 46 and the front wall 14. While the tabs 64 and 66 are preferred, those skilled in the art will appreciate that other means, such as rivets, adhesives, etc. may be substituted. The keeper 52 also includes an upstanding member 68 defining a slot 70 dimensioned to receive the latch 56 when the latch 56 is depressed. To secure the latch assembly 50 to the keeper 52, the latch 56 is depressed against the bias of the coil spring 60 and then fed into the slot 70, the taper of the latch 56 serving to guide the latch through the slot. Once the entire latch 56 clears the slot, the coil spring 60 returns the latch to its raised position whereupon the shoulder 58 engages one side of the cross bar 69 thus preventing backwards movement of the latch 56 through the slot 70. In this position, the stop bar 62, which is larger than slot 70 and thus cannot pass therethrough, engages the other side of the cross bar 69 to prevent forward movement of the latch 56 through the slot, it thus being apparent that the combination of the shoulder 58 and the stop bar 62 serves to prevent relative longitudinal movement between the latch assembly 50 and the keeper 52.

While the arrangement comprising the latch assembly 50 and the keeper 52 is preferred for securing the free end 44 of the strap 38 to the front wall 14, other means, such as Velcro strips secured to the free end 44 of the strap and to the front 14 of the bag 12, respectively, may also be used. Also, while it is presently preferred that the securement between the free end of the strap 38 and the front wall 14 of the bag 12 be non-locking, arrangements including combination locks or locks requiring keys may be employed.

According to the invention, in its rest state, the strap 38 is biased to a folded position wherein a portion 71 of the strap adjacent its free end 44 overlies the portion 72 of the strap adjacent the end 41 affixed to the front wall 14 of the bag 12. While those skilled in the art will appreciate that this bias may be built into the strap 38 in any number of ways, as presently preferred and best shown in FIGS. 3 and 4, it is preferably accomplished by forming the strap 38 from two strips of coriaceous material 74 and 76 sewn together by stitching 78 (FIG. 2), the strip 74 being somewhat shorter than the strip 76. Another possibility is to incorporate plastic materials having the desired bias directly into the strap 38. Yet another alternative is to fold a single strip of leather, wet it, and then allow it to dry in its folded form. Whatever technique is used, for reasons that will be more fully apparent hereinafter, the resulting strap 38 must be semi-rigid and elastic, the term semi-rigid meaning neither flaccid nor rigid. For example, leather and coriaceous materials have such properties and are in fact preferred for strap 38. However, other materials, alone and in combination, may also be employed. Certain plastics, for example, are suitable. While it is preferred that the strap 38 be elastic and semi-rigid along its full length, this is not necessary, and only the bight 49 of the strap 38 and the portions of the strap 38 on either side of the bight need possess these properties.

When it is desired to close the bag 12, the flap or cover 16 of the bag is moved into overlying relation with the portion 80 of the front wall 14 adjacent its upper edge 82 (FIGS. 3 and 4). The portion 71 of the strap 38 is then moved against its bias until the free end 44 can be fed through the back of the opening 23 in the link 22. At this point the strap 38 is allowed to return to its biased or folded position thus forcing the free end of the link 22 downwards towards the wall 14. Securement of the flap 16 to the wall 14 is completed by securing the latch assembly 50 to the keeper 52 in the manner more fully described above (FIG. 3). Referring now to FIGS. 2 and 4, assume that the latch assembly 50 becomes detached from the keeper 52, without any intent on the part of the owner of the bag to open it. In this position, the bias built into the strap 38 keeps the portion 71 of the strap 38 in close confronting relation with the portion 72 (FIG. 4). This bias prevents the portion 71 from slipping back through the link 22 and thus prevents disengagement of the flap 16 from the front wall 14. In the event that a positive disengaging force is applied to the flap 16, it is apparent from FIGS. 2 and 4 that because the link 22 overlies the flap 16, the edge portion 34 of the cover 16 will press against the back of the portion 72 of the strap 38 which in turn presses against the free end of the link 22. When this occurs, upward movement of portion 72 and link 22 is restricted by the portion 71 thanks to the semi-rigid nature of the strap and the bias built into the strap which collectively serve to retain the portion 71 in the position shown in FIGS. 1 and 4. Also, the disengaging force applied to the flap 16 serves to pinch the portion 72 of the strap 38 between the edge 34 of the flap 16 and the free end of the link 22 thus further restricting movement of the strap 38 back through the link. It will thus be apparent that the only way to disengage the flap 16 from the front wall 14 is to force the portion 71 of the strap 38 against the bias to a position wherein the portion 71 is substantially coplanar with the portion 72 and then pivot the link 22 until the free end 44 of the strap is disengaged from the link. This requires more than one motion, more force than is likely to occur in most accidental contacts, and a certain amount of dexterity. It will thus be apparent that even in the absence of the latch assembly 50 and the keeper 52, the construction of the strap 38 and the cooperation thereof with the link 22 provide a positive and reliable closure against the opening of the bag 12. Accordingly, while the preferred embodiment of the closure 10 includes means 42 for securing the free end of the strap 38 to the front 14 of the bag 12, closures excluding such means are within the intended scope of the present invention.

Since these as well as additional changes and modifications are intended to be within the scope of the present invention, the above description should be construed as illustrative and not in a limiting sense, the scope of the invention being defined by the following claims:

I claim:

1. A closure for a bag, said bag including a wall having an upper edge, an opening adjacent said wall, and a flap having a front edge, said flap being movable to a closed position wherein said flap overlies said opening and a portion of said flap adjacent said front edge overlies a portion of said wall adjacent said upper edge, said closure comprising:

a link having a thru-opening; means for hingeably securing said link to said flap for movement between a first position wherein said link is substantially parallel with said flap and substantially all of said thru-opening overlies said flap, and a second position wherein said link extends away from said flap, a strap proportioned in cross-section to pass through said thru-opening;

means for securing one end of said strap to said wall;

said strap being comprised of an elastic, semi-rigid material biased to a folded position wherein a portion of said strap on one side of the bight of said fold overlies a portion of said strap on the other side of said bight, said strap being moveable to a closed position wherein said strap portion between the free end of said strap and the bight thereof extends through said thru-opening, said link is in said first position, and said strap is in said folded position.

2. The closure according to claim 1, further comprising means for detachably securing said free end of said strap to said wall.

3. The closure according to claim 2, wherein said detachable securing means comprises a latch secured to the free end of said strap and a keeper secured to said wall.

4. The closure according to claim 3, wherein said bight engages said link when said strap is in said closed position.

5. The closure according to claim 1, wherein said bight engages said link when said strap is in said closed position.

* * * * *